(12) United States Patent
Shibata

(10) Patent No.: US 8,824,321 B2
(45) Date of Patent: Sep. 2, 2014

(54) MULTI-FUNCTION DEVICE

(75) Inventor: Hiroshi Shibata, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 166 days.

(21) Appl. No.: 13/234,600

(22) Filed: Sep. 16, 2011

(65) Prior Publication Data

US 2012/0076022 A1    Mar. 29, 2012

(30) Foreign Application Priority Data

Sep. 29, 2010   (JP) ................................. 2010-218096

(51) Int. Cl.
*H04L 12/26* (2006.01)
*H04N 1/04* (2006.01)
*H04N 21/4223* (2011.01)
*H04N 21/485* (2011.01)

(52) U.S. Cl.
CPC ................................. *H04L 43/0817* (2013.01)
USPC ........ 370/252; 370/230.1; 370/231; 370/412; 370/413; 370/414; 370/415; 370/416; 370/468

(58) Field of Classification Search
CPC .................................................. H04N 21/485
USPC .............. 370/250–252, 392, 401, 230.1, 231, 370/412–416, 468; 709/226
See application file for complete search history.

(56) References Cited

U.S. PATENT DOCUMENTS

| | | | |
|---|---|---|---|
| 6,321,266 B1* | 11/2001 | Yokomizo et al. | 709/226 |
| 6,714,532 B1* | 3/2004 | Kawaguchi | 370/351 |
| 7,826,356 B2* | 11/2010 | Ban et al. | 370/230 |
| 2005/0047364 A1* | 3/2005 | Matsukura et al. | 370/328 |
| 2007/0120955 A1* | 5/2007 | Shimosato | 348/14.01 |
| 2007/0258116 A1* | 11/2007 | Matsumoto et al. | 358/500 |
| 2008/0151304 A1* | 6/2008 | Matsugashita | 358/1.18 |
| 2009/0080447 A1* | 3/2009 | Sawada et al. | 370/401 |
| 2010/0046385 A1* | 2/2010 | Kamei et al. | 370/252 |
| 2010/0296515 A1* | 11/2010 | Kishi et al. | 370/395.53 |
| 2011/0261706 A1* | 10/2011 | Fujiwara et al. | 370/252 |
| 2011/0305147 A1* | 12/2011 | Xu et al. | 370/252 |

FOREIGN PATENT DOCUMENTS

| | | | |
|---|---|---|---|
| JP | 2001-177871 A | 6/2001 |
| JP | 2003-16031 A | 1/2003 |
| JP | 2004-356855 A | 12/2004 |
| JP | 2007-243369 A | 9/2007 |

* cited by examiner

*Primary Examiner* — Asad Nawaz
*Assistant Examiner* — Berhanu Belete
(74) *Attorney, Agent, or Firm* — Scully, Scott, Murphy & Presser, PC

(57) ABSTRACT

A multi-function device capable of executing a plurality of functions, the device comprising: a first acquisition unit configured to acquire communication state information relating to a current communication state of the multi-function device; a determination unit configured to determine: a first priority order in a case of a first state indicating that the current communication state of the multi-function device is good; and a second priority order in a case of a second state indicating that the current communication state of the multi-function device is poor, wherein the second priority order is different from the first priority order, and wherein each of the priority orders indicate each of priorities of the plurality of functions; and a data transmission unit configured to execute preferentially a transmission of data for a high-priority function earlier than a transmission of data for a low-priority function, based on the determined priority order.

6 Claims, 7 Drawing Sheets

FIG. 2

36: PRIORITY TABLE GROUP

PRIORITY TABLE PT1

| PRIORITY | FUNCTION |
|---|---|
| HIGH | PRINT SCAN |
| HIGH | I-FAX |
| HIGH | OTHERS (SETTINGS ETC.) |

PRIORITY TABLE PT2

| PRIORITY | FUNCTION |
|---|---|
| HIGH | PRINT SCAN |
| MEDIUM | I-FAX |
| MEDIUM | OTHERS (SETTINGS ETC.) |

PRIORITY TABLE PT3

| PRIORITY | FUNCTION |
|---|---|
| HIGH | PRINT SCAN |
| MEDIUM | I-FAX |
| LOW | OTHERS (SETTINGS ETC.) |

FIG. 3

38: WIRED CONNECTION SPEED TABLE

| COEFFICIENT | CONNECTION SPEED |
|---|---|
| 1 | 10 BASE HALF DUPLEX |
| 2 | 10 BASE FULL DUPLEX |
| 3 | 100 BASE HALF DUPLEX |
| 4 | 100 BASE FULL DUPLEX |
| 5 | 1000 BASE HALF DUPLEX |
| 6 | 1000 BASE FULL DUPLEX |

FIG. 4

40: WIRELESS CONNECTION SPEED TABLE

| COEFFICIENT | CONNECTION SPEED |
|---|---|
| 1 | 802.11b |
| 2 | 802.11a |
| 2 | 802.11g |
| 3 | 802.11n |

MULTI-FUNCTION DEVICE

CROSS-REFERENCE TO RELATED APPLICATION

This application claims priority from Japanese Patent Application No. 2010-218096 filed on Sep. 29, 2010, the entire subject matter of which is incorporated herein by reference.

BACKGROUND

This specification discloses a multi-function device capable of executing a plurality of functions.

For example, one related art discloses a server capable of performing communication with a plurality of terminals. This server stores priorities of each terminal of the plurality of terminals for connecting to the server. While the server is being connected to the maximum number of terminals that can simultaneously connects to the server, if the server receives a new connection request from an additional terminal, the server compares priorities of the at least two terminals, which are currently being connected to the server, and the priority of the additional terminal. If the priority of the additional terminal is lower than the priorities of the at least two terminals being connected to the server, the server does not establish connection with the additional terminal. If the priority of the additional terminal is higher than any one of the priorities of the at least two terminals being connected to the server, the server disconnects connection with the terminal having the lowest priority among the at least two terminals being connected to the server, and then the server establishes connection with the additional terminal.

SUMMARY

A technology has been required to properly perform the communication for each of functions executed by a multi-function device. For example, when a multi-function device is capable of executing a main function having a high necessity to quickly perform the communication, and a sub-function having a low necessity to quickly perform the communication, a technology has been required to preferentially perform communication for the main function, earlier than the transmission of the communication for the sub-function.

In view of the above, the present invention provides a technology capable of properly performing communication for each function.

An illustrative aspect of the present invention is a multi-function device capable of executing a plurality of functions. The multi-functional device includes a first acquisition unit, a determination unit, and a data transmission unit. The first acquisition unit acquires communication state information relating to a current communication state of the multi-function device. In a case of first state where the communication state information indicates that the current communication state of the multi-function device is good, the determination unit determines a first priority order indicating priorities of the plurality of functions. In a case of second state where the communication state information indicates that the current communication state of the multi-function device is poor, the determination unit determines a second priority order different from the first priority order indicating priorities of the plurality of functions. In accordance with the determined priority order, the data transmission unit preferentially executes the transmission of data for a function having a high-priority, earlier than the transmission of data for a function having a low-priority.

Accordingly, the multi-function device of the illustrative aspect determines different priority orders, in accordance with the case where the current communication state is good or the case where the current communication state is poor. In accordance with the determined priority orders, the multi-function device preferentially executes the transmission of data for a function having the high-priority, earlier than the transmission of data for a function having the low-priority. Accordingly, the multi-function device is capable of properly performing the communication (the transmission of data) for each function in accordance with the communication state.

A control method and a computer program for the multi-function device and a non-transitory computer-readable medium for storing the computer program are also effective as novel inventions.

BRIEF DESCRIPTION OF THE DRAWINGS

FIG. 2 is a view that illustrates an example of a priority table group;

FIG. 3 is a view that illustrates an example of a wired connection speed table;

FIG. 4 is a view that illustrates an example of a wireless connection speed table;

DETAILED DESCRIPTION OF THE INVENTION

First Exemplary Embodiment

Configuration of a System

Figure 1:
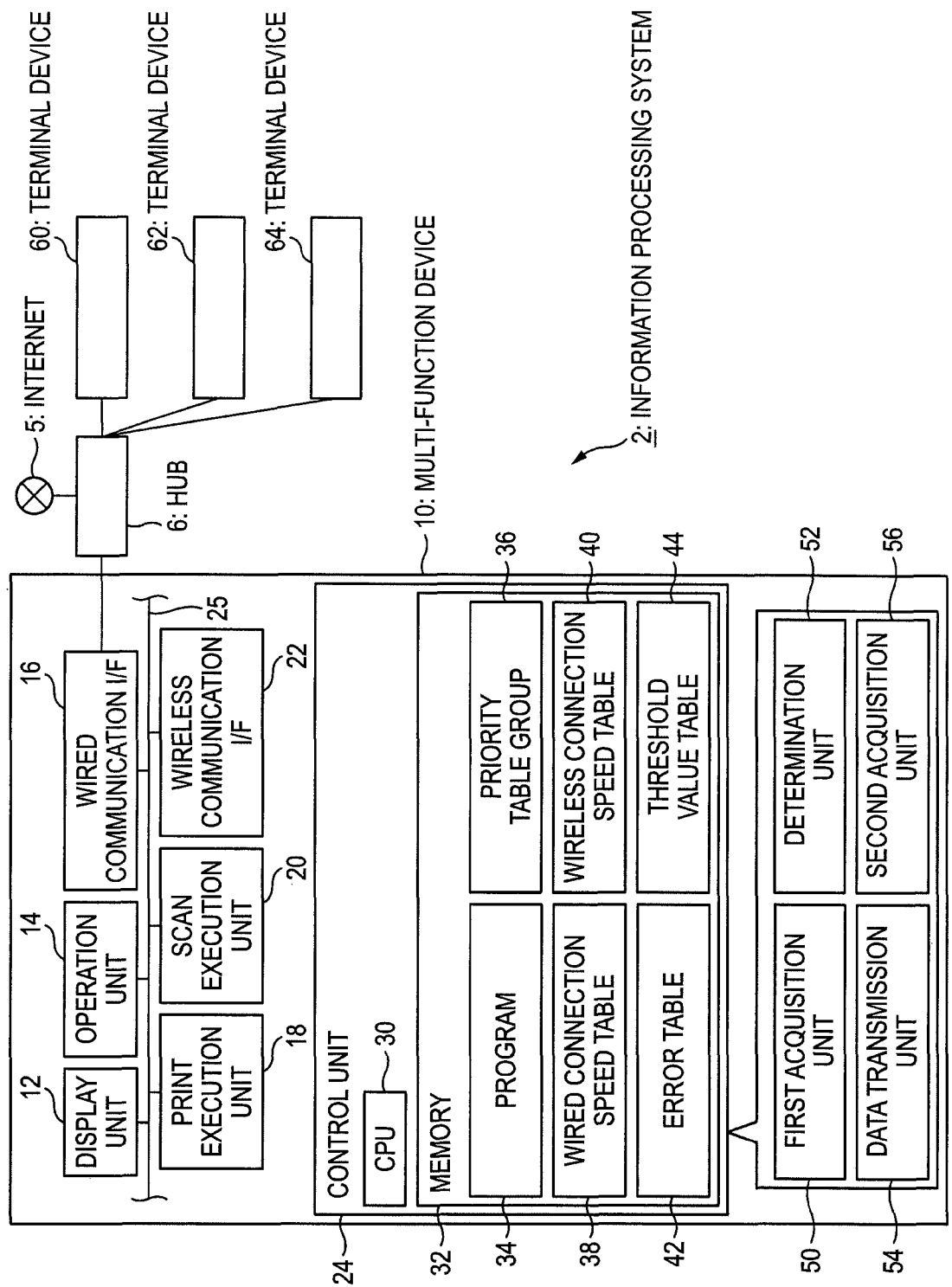
FIG. 1 is a view that illustrates configuration of an information processing system.

A first exemplary embodiment will be described with reference to the accompanying drawings. As shown in FIG. 1, an information processing system 2 includes a multi-function device 10, a HUB 6, and a plurality of terminal devices 60, 62, and 64. The multi-function device 10 and each of the terminal devices 60, 62, and 64 are connected to the HUB 6, and can be communicated with one another through the HUB 6. The HUB 6 is connected to Internet 5. The terminal devices 60, 62, and 64 are terminal devices such as PCs.

(Configuration of the Multi-Function Device 10)

The multi-function device 10 is capable of executing multiple functions including a print function, a scan function, an Internet fax (hereinafter referred to as "I-FAX") function, and others. The multi-function device 10 includes a display unit 12, an operation unit 13, a wired communication interface 17, a print execution unit 18, a scan execution unit 20, a wireless communication interface 22, and a control unit 24. Each of the units 12 to 24 is connected to a bus line 25.

The display unit 12 is a display for displaying various information. A user can input various information into the multi-function device 10 by operating the operation unit 14. The wired communication interface 16 is an interface for enabling the multi-function device 10 to perform wired communication. The print execution unit 18 includes a print mechanism such as an inkjet method and a laser method to execute printing in accordance with a command from the control unit 24. The scan execution unit 20 includes scan mechanisms such as CCD and CIS to scan an object to be scanned thereby generating image data. The wireless communication interface 22 is an interface for enabling the multi-function device 10 to perform wireless communication through a non-illustrated access point. The multi-function device 10 is connected to LAN through the wired communication interface 16 or the wireless communication interface 22. In the first exemplary embodiment, the multi-function device 10 is connected by wire to the HUB 6 through the wired communication interface 16.

The control unit 24 includes a CPU 30 and a memory 32. The memory 32 stores programs 34, a priority table group 36 (refer to FIG. 2), a wired connection speed table 38 (refer to FIG. 3), a wireless connection speed table 40 (refer to FIG. 4), an error table 42, and a threshold value table 44. The CPU 30 executes various processes in accordance with the programs 34 stored in the memory 32, whereby function of each of units 50 to 56 (will be described below) is performed.

(Contents of Each of the Tables)

In the first exemplary embodiment, each of the tables 36 to 44 are registered in the memory 32 at the stage of shipping the multi-function device 10 in advance. However, in a modified exemplary embodiment, the multi-function device 10 may acquire the tables 36 to 44 through the Internet from a server provided by a vender of the multi-function device 10. In another modified exemplary embodiment, the multi-function device 10 may acquire the tables 36 to 44 from a media (such as a USB memory) provided by a vender of the multi-function device 10.

(Priority Table Group 36)

As shown in FIG. 2, the priority table group 36 includes three priority tables PT1 to PT3. In each of the priority tables PT1 to PT3, a priority corresponds to each of functions, which can be executed by the multi-function device 10.

In the priority table PT1, high-priorities correspond to the "print/scan". the "I-FAX", and "others (settings etc.)". That is, all the functions have the same priority. In the priority table PT2, a high-priority corresponds to the "print/scan" and a medium-priority corresponds to the "I-FAX" and the "others (settings etc.)". That is, the priority of the "print/scan" is higher than the priorities of the "I-FAX" and the "others (settings etc.)." The priority of the "I-FAX" is the same as the priority of the "others (settings etc.)." In the priority table PT3, a high-priority corresponds to the "print/scan", a medium-priority corresponds to the "I-FAX", and a "low" priority corresponds to the "others (settings etc.)." That is, the priority of the "print/scan" is higher than the priority of the "I-FAX." The priority of the "I-FAX" is higher than the priority of the "others (settings etc.)." As clearly understood from the above descriptions, the priority tables PT1 to PT3 are different from one another.

Incidentally, the "I-FAX" is not FAX communication using a Public Switched Telephone Network (PSTN), but a function for performing FAX communication using an electronic mail. The "others (settings etc.)" are functions other than the print function, the scan function, and the I-FAX function. Examples of the "others (settings etc.)" include a setting information transmission function for transmitting setting information of the multi-function device 10, in accordance with a request from the terminal device 60 or others, a function for transmitting an image showing received FAX data, in accordance with a request from the terminal device 60 or others, a function for transmitting a response packet, when a confirmation packet (e.g., a PNG packet) for confirming the operation is received, and a function for transmitting a response packet to an inquiry about a communication environment from the terminal device 60.

Generally, a user may purchases the multi-function device 10, considering execution of the print function and the scan function, earlier than the transmission of the I-FAX function, the setting information transmission function, or others. In other words, a user may regard the print function and the scan function as the main functions, and may regard the I-FAX function, the setting information transmission function, and others as the sub-functions. In view of the above, in all the priority tables PT1 to PT3, high-priorities correspond to the "print/scan". That is, the print function and the scan function, which are the main functions, have the highest priority, in all the priority tables. Meanwhile, the main function and the sub-function may be regard as a "main function, for which data transmission needs to be quickly executed," and a "sub-function," for which data transmission does not need to be quickly executed, respectively.

(Wired Connection Speed Table 38)

As shown in FIG. 3, in the wired connection speed table 38, a predetermined coefficient corresponds to a connection speed (i.e., communication speed) of the wired communication. In the wired connection speed table 38, a larger coefficient corresponds to a faster connection speed.

(Wireless Connection Speed Table 40)

As shown in FIG. 4, in the wireless connection speed table 40, a predetermined coefficient corresponds to a connection speed of wireless communication. Likewise, in the wireless connection speed table 40, a larger coefficient corresponds to a faster connection speed. That is, the wireless communication using IEEE802.11b has the latest connection speed. The wireless communication using IEEE802.11n has the fastest connection speed.

(Error Table 42)

In an error table 42, a predetermined coefficient corresponds to a ratio of error packets among total packets communicated (transmitted or received) by the multi-function device 10 for a predetermined time period. Meanwhile, the error packet means a packet, which has failed to be transmitted in a case of the transmission, and a packet, which has been received but cannot be read in a case of the reception. The specific values in the error table 42 will be described later.

(Threshold Value Table 44)

The threshold value table 44 of FIG. 1 includes thresholds for the number of packets, evaluation thresholds X and Y, and a maximum communication speed. The thresholds for the number of packets are referenced in an evaluation value calculating process (refer to FIG. 7), which will be described later. The thresholds for the number of packets are to classify the large number of packets and the small number of packets communicated (transmitted or received) by the multi-function device 10 for a predetermined time period. The evaluation thresholds X and Y are referenced in a priority specifying process (refer to FIG. 6), which will be described later. The evaluation thresholds X and Y are to classify the communication state of the multi-function device 10 into any one of "good," "normal," and "poor." The maximum communication speed is referenced in an evaluation value calculating process (refer to FIG. 7), which will be described later. The maximum communication speed is a maximum communication speed, which can be performed by the multi-function device 10.

(Processes Executed by the Multi-Function Device 10)

Figure 5:
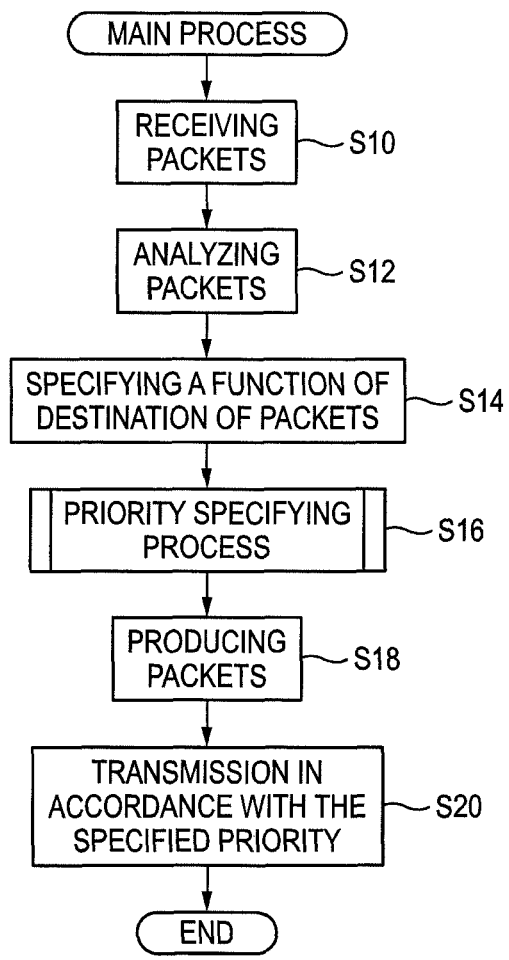
FIG. 5 is a view that illustrates a flowchart of a main process of a multi-function device.

Hereinafter, processes executed by the control unit 24 of the multi-function device 10 will be described with reference to FIGS. 5 to 7. As shown in FIG. 5, in step S10, the control unit receives packets from an external device (e.g., the terminal device 60) through the HUB 6. For example, the control unit 24 receives packets including print data of an object to be printed (hereinafter referred to as "print packets"), packets including a scan execution command (hereinafter referred to as "scan packets"), packets including FAX data (i.e., data of I-FAX) in the form of an electronic mail (hereinafter referred to as "I-FAX packets"), and packets including a setting information request (hereinafter referred to as "setting information request packets").

Next, in step S12, the control unit 24 analyzes the received packets. In step S12, the control unit 24 analyzes the packets by using a protocol stack. Next, in step S14, the control unit 24 specifies functions, which should be executed by using the packets (i.e., applications, which should execute functions by using the packets), based on destination port numbers stored in the packets. Next, in step S16, the control unit 24 executes the priority specifying process (refer to FIG. 6).

Figure 6:
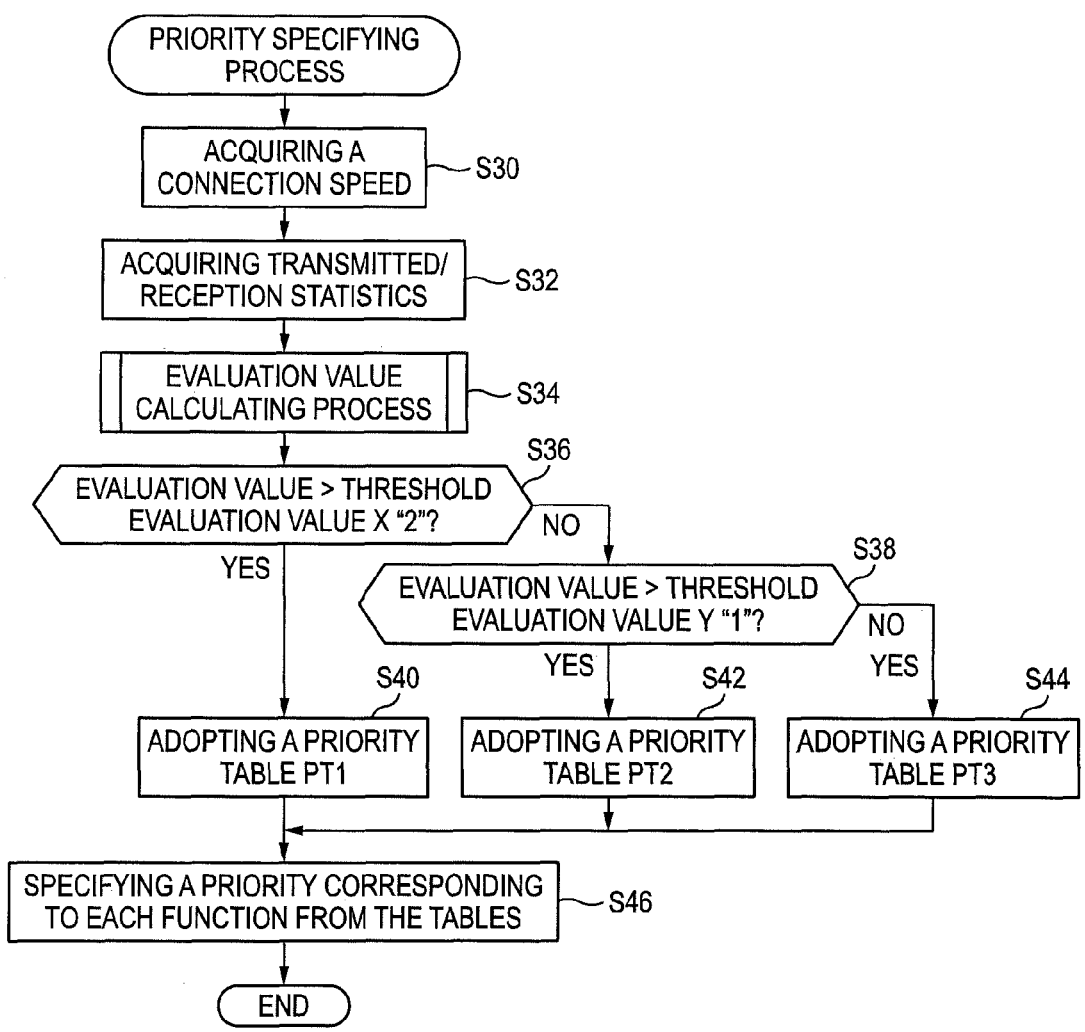
FIG. 6 is a view that illustrates a flowchart of a priority specifying process.

(Priority Specifying Process of FIG. 6)

As shown in step S30, the first acquisition unit 50 (refer to FIG. 1) acquires a connection speed of the multi-function device 10. In the first exemplary embodiment, since the multi-function device 10 is performing wired communication, in step S30, the first acquisition unit 50 acquires the connection speed, e.g., 100 Base Half Duplex (refer to FIG. 3), from the wired communication interface 16. If the multi-function device 10 is performing wireless communication, in step S30, the first acquisition unit 50 acquires the connection speed [e.g., IEEE802.11g (refer to FIG. 4)] from the wireless communication interface 22.

Next, in step S32 of FIG. 6, the second acquisition unit 56 (refer to FIG. 1) acquires transmission statistics and reception statistics of the multi-function device 10. The transmission statistics are information including the number of packets transmitted by the multi-function device 10 (hereinafter referred to as "the number of transmitted packets") for a predetermined time period (e.g., five minutes) from a predetermined prior time, which is a time gone back to the predetermined time period from the present time, to the present time, a size of total data of total packets transmitted by the multi-function device 10 for the predetermined time period (hereinafter referred to as "size of total transmitted data"), and the number of error packets transmitted by the multi-function device 10 for the predetermined time period (hereinafter referred to as "the number of transmitted error packets"). The reception statistics are information including the number of packets received by the multi-function device 10 for the predetermined time period (hereinafter referred to "the number of received packets"), a size of total data of total packets received by the multi-function device 10 for the predetermined time period (hereinafter referred to as "the size of total received data"), and the number of error packets received by the multi-function device 10 for the predetermined time period (hereinafter referred to as "the number of received error packets"). Additionally, each time one packet is communicated (transmitted or received) by the multi-function device 10, the control unit 24 stores communication time for the packet, a data size of the packet, and information as to whether or not the packet is an error packet, in the memory 32. Accordingly, in step S32, the second acquisition unit 56 may acquire the transmission statistics and the reception statistics. When step S32 is finished, in step S34, the first acquisition unit 50 executes the evaluation value calculating process (refer to FIG. 7).

Figure 7:
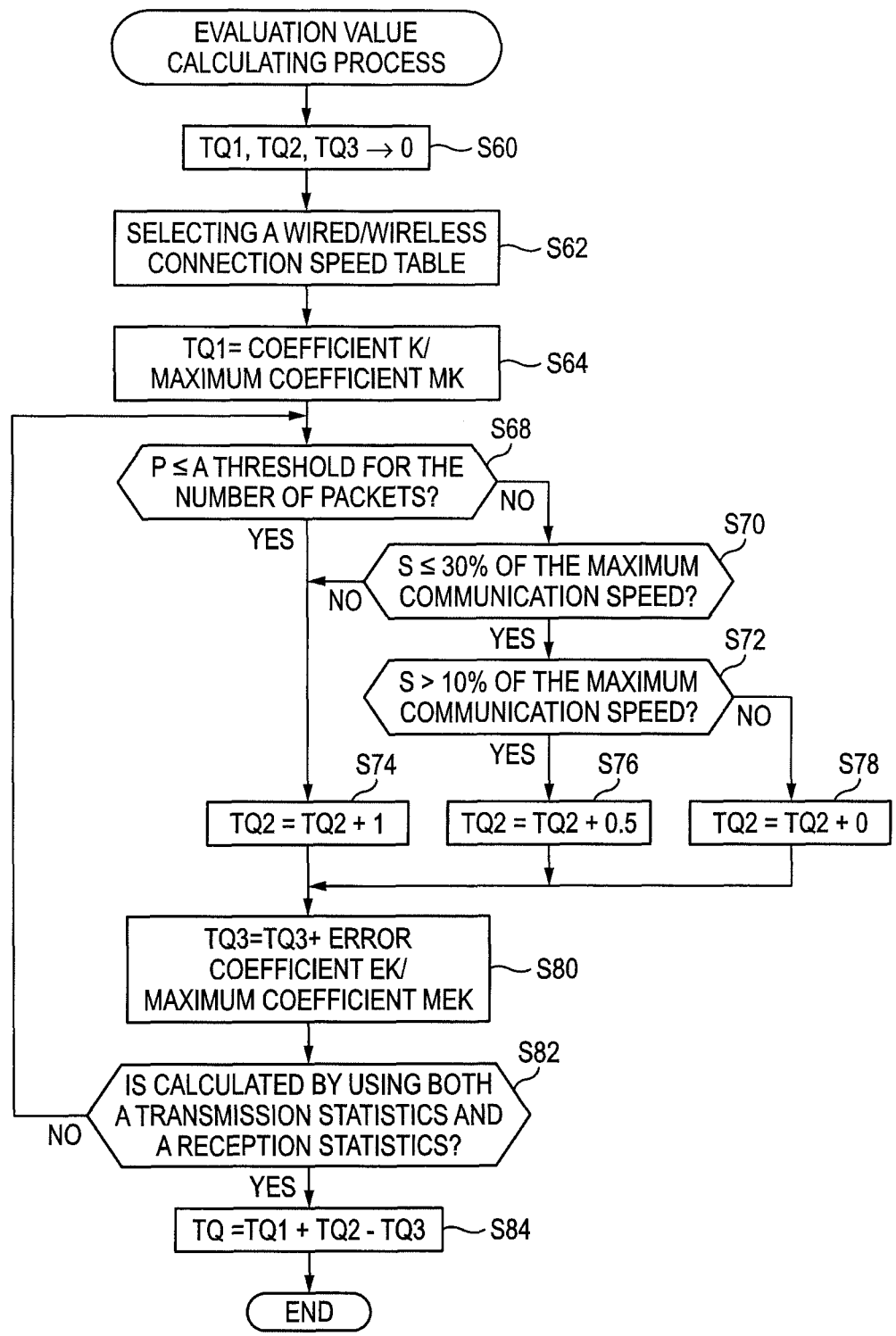
FIG. 7 is a view that illustrates a flowchart of an evaluation value calculating process.

(Evaluation Value Calculating Process of FIG. 7)

In step S60 of FIG. 7, the first acquisition unit 50 clears values for communication quality information TQ1, TQ2, and TQ3 stored in the memory 32 at the present time (namely, the first acquisition unit 50 makes the values be "0", hereinafter the number such as "0" indicates the numerical values to be used for calculations). The communication quality information TQ1, TQ2, and TQ3 will be described in detail later.

Next, in step S62, the first acquisition unit 50 selects one of the wired connection speed table 38 and the wireless connection speed table 40, based on wired communication and wireless communication being performed by the multi-function device 10. In the first exemplary embodiment, the first acquisition unit 50 selects the wired connection table 38. Next, in step S64, the first acquisition unit 50 calculates the communication quality information TQ1. Specifically, the first acquisition unit 50 specifies a coefficient K corresponding to the connection speed of the multi-function device 10 acquired in step S30 of FIG. 6, from the wired connection speed table 38 or the wireless connection speed table 40 selected in step S60. The first acquisition unit 50 specifies a maximum coefficient MK in the table, from the wired connection speed table 38 or the wireless connection speed table 40 selected in step S60. The first acquisition unit 50 calculates the communication quality information TQ1 through the calculation of TQ1=K/MK.

For example, when the multi-function device 10 is performing wired communication, and the connection speed is "100 Base Half Duplex," in step S64, the first acquisition unit 50 specifies that the coefficient K is "3" corresponding to the connection speed and the maximum coefficient MK is "6" from the wired connection speed table 38 (refer to FIG. 3). Next, the first acquisition unit 50 calculates the communication quality information TQ1 as follows: TQ1=K/MK=3/6=0.5. For example, if the multi-function device 10 is performing wireless communication and if the connection speed thereof is "IEEE802.11g," in step S64, the first acquisition unit 50 specifies that the coefficient K is "2" corresponding to the connection speed and the maximum coefficient MK is "3" from the wireless connection speed table 40 (refer to FIG. 4). Next, the first acquisition unit 50 calculates the communication quality information TQ1 as follows: TQ1=K/MK=2/3=0.67.

When in step S64 is finished, the first acquisition unit 50 executes processes of steps S68 to S80 of FIG. 7 for the transmission statistics or the reception statistics acquired in step S32 of FIG. 6. In the first exemplary embodiment, the first acquisition unit 50 executes the processes of steps S68 to S80 by using the transmission statistics, and then the processes of steps S68 to S80 by using the reception statistics. Hereinafter, the processes of steps S68 to S80 executed by using the transmission statistics will be described in detail.

In step S68, the first acquisition unit 50 determines whether or not the packet count P is less than a threshold for the number of packets. The packet count P is the number of transmitted packets stored in the transmission statistics (i.e., the number of packets transmitted for the predetermined time period). As described above, the threshold for the number of packets is stored in the threshold value table 44 of the memory 32 (refer to FIG. 1). In the first exemplary embodiment, the threshold for the number of packets is 300. If the packet count P is less than the threshold for the number of packets, the first acquisition unit 50 determines that step S68 is YES.

If step S68 is YES, the process proceeds to step S74. In step S74, the first acquisition unit 50 calculates a new value to be "1" as the communication quality information TQ2 through the calculation: TQ2=TQ2+1=0+1. When step S74 is finished, the process proceeds to step S80.

Meanwhile, if step S68 is NO, the process proceeds to step S70. In step S70, the first acquisition unit 50 determines whether or not a transmission speed S is less than 30% of the maximum communication speed. The transmission speed S is a value obtained by dividing a size of total data stored in the transmission statistics (i.e., a size of total data of total packets transmitted for the predetermined time period) by the predetermined time period. Thus, if a size of total transmitted data is 6000 (bytes), and the predetermined time period is 5 minutes (300 seconds), the first acquisition unit 50 calculates that 6000/300=20 (byte/second) as the transmission speed S. As described above, the maximum communication speed is stored in the threshold value table 44 of the memory 32. In the first exemplary embodiment, the maximum communication speed is 400 (Kbytes/second). Accordingly, 30% of the maximum communication speed is 120 (Kbytes/second). In case that the transmission speed S is less than 30% of the maximum communication speed, the first acquisition unit 50 determines that step S70 is YES, so that the process proceeds to step S72. In case that the transmission speed S is larger than 30% of the maximum communication speed, the first acquisition unit 50 determines that step S70 is NO, so that the process proceeds to step S74.

In step S72, the first acquisition unit 50 determines whether or not the transmission speed S is larger than 10% of the maximum communication speed. In the first exemplary embodiment, 10% of the maximum communication speed is 40 (Kbytes/second). If the transmission speed S is larger than 10% of the maximum communication speed, the first acquisition unit 50 determines that S72 is YES, so that the process proceeds to step S76. If the transmission speed S is less than 10% of the maximum communication speed, the first acquisition unit 50 determines that step S72 is NO, so that the process proceeds to step S78.

In step S76, the first acquisition unit 50 calculates a new value to be "0.5" as the communication quality information TQ2 through the calculation: TQ2=TQ2+0.5=0+0.5. When step S76 is finished, the process proceeds to step S80. In step S78, the first acquisition unit 50 maintains the current value as the communication quality information TQ2 (TQ2=TQ2+0=0+0). When S78 is finished, the process proceeds to S80.

In step S80, the first acquisition unit 50 calculates the communication quality information TQ3. Specifically, the first acquisition unit 50 first calculates a ratio of the number of transmitted error packets stored in the transmission statistics (i.e., the number of error packets transmitted by the multi-function device 10 for the predetermined time period) to the number of transmitted packets stored in the transmission statistics (i.e., the number of packets transmitted by the multi-function device 10 for the predetermined time period). Next, the first acquisition unit 50 specifies that a coefficient EK corresponding to the calculated ratio of error packets, from the error table 42 of the memory 32 (refer to FIG. 1). The first acquisition unit 50 also specifies a maximum coefficient MEK in the error table 42. The first acquisition unit 50 calculates new communication quality information TQ3 through the calculation: TQ3=TQ3+EK/MEK.

In the error table 42, a coefficient EK being "1" corresponds to an error ratio of "smaller than 10%," a coefficient EK being "2" corresponds to an error ratio of "more than 10% and smaller than 50%" and a coefficient EK being "3" corresponds to an error ratio of "more than 50%." That is, a larger coefficient corresponds to a larger ratio of error packets. If the number of packets stored in the transmission statistics is "4," and the number of error packets stored in the transmission statistics is "1", the ratio of the error packets is 25%. In that case, the first acquisition unit 50 specifies that the coefficient EK is "2" and the maximum coefficient MEK is "3", which correspond to 25%, from the error table 42. The first acquisition unit 50 calculates communication quality information TQ3, as follows: TQ3=TQ3+EK/MEK=0+2/3=0.67. When step S80 is finished, the process proceeds to step S82.

In step S82, the first acquisition unit 50 determines whether or not the processes of step 68 to step S80 have been executed by using both the transmission statistics and the reception statistics. In case that step S82 is NO, namely, if the processes have been executed by using only the transmission statistics, the first acquisition unit 50 also executes the processes of S68 to S80 by using the reception statistics, like the transmission statistics. That is, in step S68, the number of received packets stored in the reception statistics is used. In steps S70 and S72, a size of total received data stored in the reception statistics is used. In step S80, the number of received packets and the number of received error packets, which are stored in the reception statistics, are used. Even though the processes for steps S68 to S80 are executed by using the reception statistics, the value for TQ1 does not change. However, values for TQ2 and TQ3 may change.

In case that step S82 is YES, the first acquisition unit 50 calculates the evaluation value TQ, in step S84. Specifically, the first acquisition unit 50 calculates the evaluation value TQ through the calculation: TQ=TQ1+TQ2−TQ3. Once the evaluation value TQ is calculated, the evaluation value calculating process of FIG. 7 (S34 of FIG. 6) is finished.

As the above descriptions, the communication quality information TQ1 increases as the communication speed increases. The communication quality information TQ2 increases, as the number of communicated packets is reduced and as the communication speed increases. The communication quality information TQ3 increases as the number of error packets increases. Accordingly, when the evaluation value TQ calculated by TQ1+TQ2−TQ3 is large, it indicates that the communication state is good. When the value is small, it indicates that the communication state is poor. In the first exemplary embodiment, since the evaluation value TQ is calculated, it is possible to properly determine the current communication state of the multi-function device. Especially, in order to calculate the evaluation value TQ, it uses the connection speed of the multi-function device, the number of transmitted and received packets, a size of total transmitted and received data, the number of transmitted and received error packets, and others. Accordingly, it is possible to properly determine the current communication state of the multi-function device.

(Follow-Up for the Priority Specifying Process of FIG. 6)

Next, in step S36 of FIG. 6, the determination unit 52 (refer to FIG. 1) determines whether or not the evaluation value calculated in step S82 of FIG. 7 is larger than the evaluation threshold X being "2". As described above, the evaluation thresholds X and Y are stored in the threshold value table 44. When the evaluation value TQ is larger than the evaluation threshold X being "2", namely when step S36 is YES, it means that the current communication state of the multi-function device 10 is good. In that case, in step S40, the determination unit 52 selects the priority table PT1 from the priority table group 36 (refer to FIG. 2). When step S40 is finished, the process proceeds to step S46.

When the evaluation value TQ is less than the evaluation threshold X being "2", namely when step S36 is NO, the determination unit 52 determines whether or not the evaluation value TQ is larger than the evaluation threshold Y being "1". If the evaluation value TQ is larger than the evaluation threshold Y being "1", namely step S38 is YES, it means that the current communication state of the multi-function device is normal. In that case, in step S42, the determination unit 52 selects the priority table PT2 from the priority table group 36. If the evaluation value TQ is less than the evaluation threshold Y being "1", namely step S38 is NO, it means that the current communication state of the multi-function device 10 is poor. In that case, in step S44, the determination unit 52 selects the priority table PT3 from the priority table group 36. When step S42 or step S44 is finished, the process proceeds to S46.

In step S46, the determination unit 52 specifies the priority corresponding to each function from the priority table selected in any one of steps S40 to S44. When step S46 is finished, the priority specifying process of FIG. 6 (S16 of FIG. 5) is finished.

(Continuation of the Main Process of FIG. 5)

Next, in step S18 of FIG. 5, the data transmission unit 54 (refer to FIG. 1) produces packets (data) for the functions specified in step S14. For example, in case that the print function has been specified in step S14, the control unit 24 first controls the print execution unit 18 to execute printing (i.e., execute the print function), based on the print packets (i.e., print data) received in step S10, and then the data transmission unit 54 produces packets indicating that the reception of the print data has been finished. In case that the scan function has been specified in step S14, the control unit 24 first controls the scan execution unit 20 (refer to FIG. 1) to execute scanning (i.e., execute the scan function), and then the data transmission unit 54 produces packets including scan data obtained from the scanning. If the I-FAX function has been specified in step S14, the control unit 24 first controls the print execution unit 18 to execute printing (i.e., execute the I-FAX function), based on the I-FAX packets (i.e., I-FAX data) received in step S10, and then the data transmission unit 54 produces packets indicating that reception of the I-FAX data has been finished. If the setting information transmission function has been specified in step S14, the data transmission unit 54 acquires setting information (e.g., an amount of ink in the multi-function device 10) required by the setting information request packets received in step S10, and produces packets including the setting information. When the produced packets including the setting information are transmitted, the setting information transmission function is executed. Every time one packet is generated in step S18, the packet is stored in the transmission queue.

Next, in step S20, the data transmission unit 54 executes data transmission, in accordance with the priority of each of the functions specified in step S46 of FIG. 6. That is, the data transmission unit 54 preferentially transmits packets for a function having a high-priority stored in the transmission queue, and then packets for a function having a low-priority stored in the queue. The data transmission process may be indicated as a PQ (Priority Queuing) process. For example, it is assumed that print packets including print data and I-FAX packets including I-FAX data are received simultaneously. In that case, if the priority table PT2 is specified in step S42 of FIG. 6, a priority of the print function is specified as the high-priority, and a priority of the I-FAX function is specified as the medium-priority. In step S20 of FIG. 5, the data transmission unit 54 preferentially transmits the packets for the print function having the high-priority (packets indicating that reception of print data has been finished), earlier than the transmission of the packets for the I-FAX function having the medium-priority (packets indicating that reception of the I-FAX data has been received), regardless of the order of packets in the transmission queue. When step S20 is finished, the main process is finished.

(Specific Example)

Figure 8:
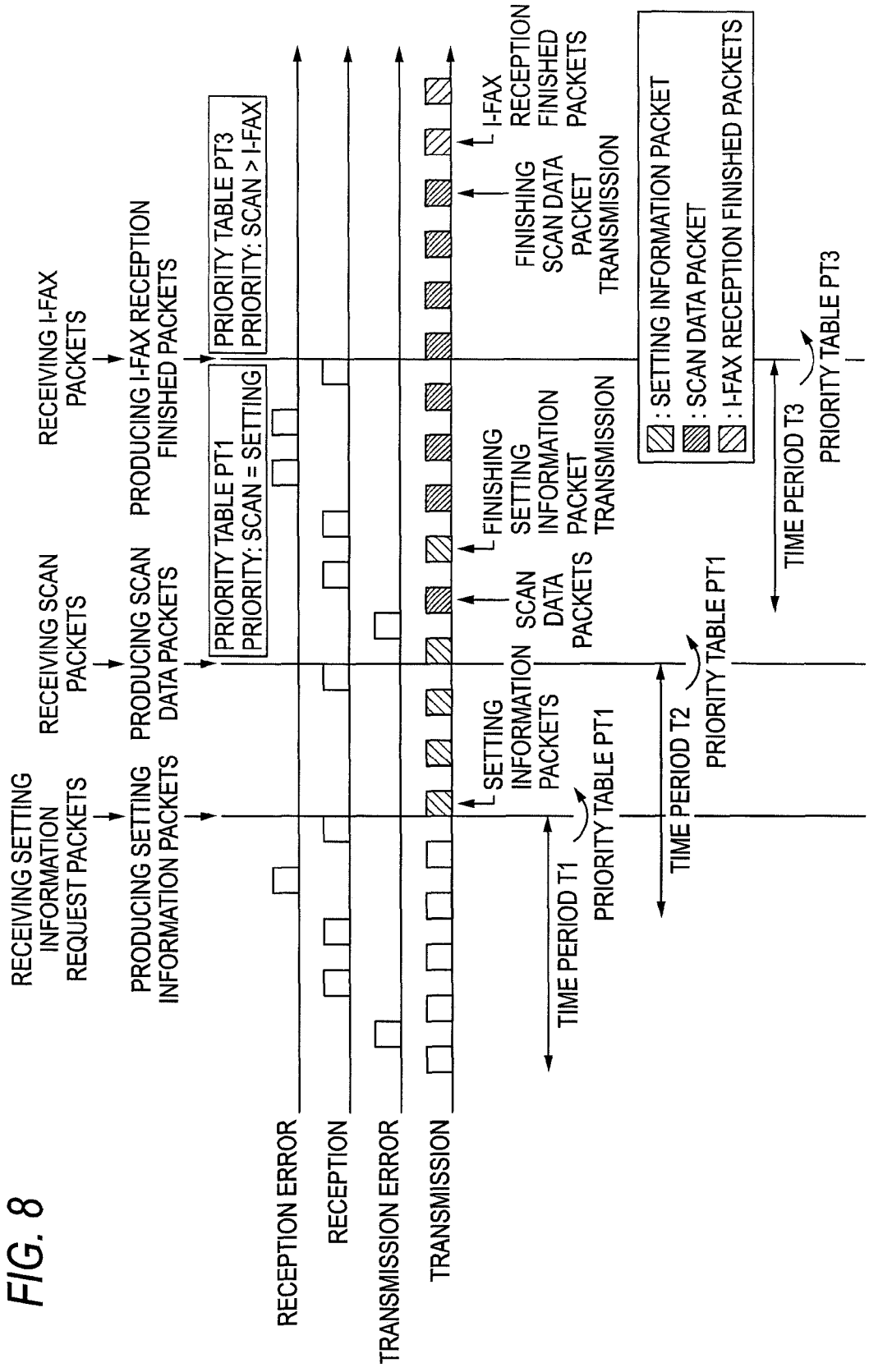
FIG. 8 is a view that illustrates an example of a time chart of processes executed by a multi-function device.

With reference to FIG. 8, an specific example of processes executed by the control unit 24 of the multi-function device 10 will be described, in more detail. In the example of FIG. 8, the multi-function device 10 sequentially receives the setting information request packets, the scan packets, and the I-FAX packets.

(Processes when the Setting Information Request Packets are Received)

When the setting information request packets are received by the multi-function device 10, the control unit 24 analyzes the setting information packets (steps S12 and S14 of FIG. 5). Next, the first acquisition unit 50 acquires the connection speed of the multi-function device 10 (step S30 of FIG. 6). Next, the second acquisition unit 56 acquires the transmission statistics and the reception statistics for a predetermined time period T1 from the predetermined prior time to the present time (step S32 of FIG. 6). In the example of FIG. 8, for the predetermined time period T1, the number of the transmitted packets is "5", the number of the transmitted error packets is "1", the number of the received packets is "3", and the number of the received error packets is "1".

The first acquisition unit 50 executes the evaluation value calculating process of FIG. 7 by using the connection speed, the transmission statistics, and the reception statistics. As a result of the evaluation value calculating process, the first acquisition unit 50 calculates the evaluation value TQ. Next, the determination unit 52 compares the evaluation value TQ and the evaluation thresholds X and Y (step S36 and step S38 of FIG. 6). As a result, in the example of FIG. 8, the determination unit 52 determines that the current communication state of the multi-function device 10 is good (YES in step S36 of FIG. 6) and selects the priority table PT1 (refer to FIG. 2) (step S40 of FIG. 6).

The determination unit 52 specifies a priority of each function from the priority table PT1 (S46 of FIG. 6). Accordingly, the high-priority is specified as a priority corresponding to the setting information transmission function ["others (settings etc.)"]. The data transmission unit 54 produces packets including the setting information (hereinafter referred to as "setting information packets") (S18 of FIG. 5) and starts transmitting the setting information packets in accordance with the high-priority. However, in this time, since only the setting information packets are stored in the transmission queue, only the setting information packets are transmitted sequentially.

(Processes when the Scan Packets are Received)

In the example of FIG. 8, the scan packets are received by the multi-function device 10 before all of the transmission of the setting information packets is finished. Once the scan packets are received by the multi-function device 10, the control unit 24 analyzes the scan packets (step S12 and step S14 of FIG. 5). Next, the first acquisition unit 50 acquires the connection speed of the multi-function device 10 (step S30 of FIG. 6). Next, the second acquisition unit acquires the transmission statistics and the reception statistics for a predetermined time period T2 from a predetermined prior time to the present time (step S32 of FIG. 6). Incidentally, the length of the predetermined time period T2 is the same as the predetermined time period T1. In the example of FIG. 8, in the predetermined time period T2, the number of the transmitted packets is "5", the number of the transmitted error packets is "0", the number of the received packets is "2", and the number of the received error packets is "1".

The first acquisition unit 50 calculates the evaluation value TQ by executing the evaluation value calculating process of FIG. 7 by using the connection speed, the transmission statistics, and the reception statistics. The calculated evaluation value TQ may be different from the evaluation value TQ calculated when the setting information requesting packets are received. However, in the example of FIG. 8, the determination unit 52 determines that the current communication state of the multi-function device 10 is good (YES in step S36 of FIG. 6) based on the evaluation value TQ and selects the priority table PT1 again (S40 of FIG. 6).

The determination unit 52 specifies a priority of each function from the priority table PT1 (refer to FIG. 2) (S46 of FIG. 6). Accordingly, the high-priority is specified as a priority corresponding to the setting information transmission function ("others (settings etc.)"), and the high-priority is also specified as a priority corresponding to the scan function ("print/scan"). The control unit 24 controls the scan execution unit 20 to execute scanning thereby generating scan data. The data transmission unit 54 produces packets including the scan data (hereinafter referred to as "scan data packets") (step S18 of FIG. 5). The data transmission unit 54 starts transmitting the scan data packets in accordance with the specified high-priority. Continuously, the data transmission unit 54 executes the transmission of the setting information packets in accordance with the specified high-priority. In the priority table PT1, both the priority of the setting information transmission function and the priority of the scan function are high. That is, there is no difference between the priority of the setting information transmission function and the priority of the scan function. As such, the data transmission unit 54 transmits the packets sequentially in the order in which the packets are stored in the transmission queue. In the example of FIG. 8, the data transmission unit 54 transmits sequentially the setting information packets, the scan data packets, and finally the setting information packets. As a result, the transmission of the setting information packets is finished. Thereafter, since only the scan data packets are stored in the transmission queue, only the scan data packets are transmitted sequentially.

(Processes when the I-Fax Packets are Received)

In the example of FIG. 8, the I-FAX packets are received by the multi-function device 10 before all of the transmission of the scan data packets is finished. Once the I-FAX packets are received by the multi-function device 10, the control unit 24 analyzes the I-FAX packets (step S12 and step S14 of FIG. 5). Next, the first acquisition unit 50 acquires the connection speed (S30 of FIG. 6) of the multi-function device 10. Next, the second acquisition unit acquires the transmission statistics and the reception statistics for predetermined time period T3 from the predetermined prior time to the present time (S32 of FIG. 6). The length of the predetermined time period T3 is the same of the predetermined time periods T1 and T2. In the example of FIG. 8, for the predetermined time period T3, the number of the transmitted packets is "5", the number of the transmitted error packets is "0", the number of the received packets is "3", and the number of the received error packets is "2".

The first acquisition unit 50 calculates the evaluation value TQ by executing the evaluation value calculating process of FIG. 7 by using the connection speed, the transmission statistics, and the reception statistics. The calculated evaluation value TQ may be different from the evaluation value TQ calculated when the scan packets are received. As a result, in the example of FIG. 8, the determination unit 52 determines that the current communication state of the multi-function device 10 is poor (NO in step S38 of FIG. 6) based on the evaluation value TQ, and selects the priority table PT3, instead of the priority table PT1 (step S44 of FIG. 6).

The determination unit 52 specifies priorities of each function from the priority table PT3 (refer to FIG. 2) (S46 of FIG. 6). Accordingly, the high-priority is specified as a priority corresponding to the scan function ("print/scan"), and the medium-priority is specified as a priority corresponding to the I-FAX function ("I-FAX"). The data transmission unit 54 produces packets indicating that reception of the I-FAX data has been finished (hereinafter, "I-FAX reception finished packets") (S18 of FIG. 5). The data transmission unit 54 starts transmitting the I-FAX reception finished packets in accordance with the specified medium-priority. Meanwhile, the data transmission unit 54 executes the transmission of the scan data packets in accordance with the specified high-priority. In the priority table PT3, the priority of the scan function is higher than the priority of the I-FAX function. Accordingly, the data transmission unit 54 preferentially transmits the scan data packets stored in the transmission queue, earlier than the transmission of the I-FAX reception finished packets stored in the transmission queue. As a result, as shown in the example of FIG. 8, the four scan data packets are transmitted sequentially. Accordingly, transmission of the scan data packets is finished. After that, since only the I-FAX reception finished packets are stored in the transmission queue, only the I-FAX reception finished packets are transmitted sequentially.

(Effect of the First Exemplary Embodiment)

The information processing system 2 of the first exemplary embodiment has been described in detail. As described, the multi-function device 10 determines different priority tables PT1 to PT3 depending on the case that the current communication state is good (YES in step S36 of FIG. 6), normal (YES in step S38), or poor (NO in step S38). The multi-function device 10 preferentially executes the transmission of packets for a function having a high-priority, earlier than the transmission of packets for a function having a low-priority. Accordingly, the multi-function device 10 is capable of properly executing the transmission of packets for each function in accordance with the communication state.

Generally, if the current communication state of the multi-function device 10 is good, the multi-function device 10 can performs simultaneously and quickly communications for at least two functions. As such, if the current communication state of the multi-function device 10 is good, there is low necessity to make a difference of priority between the print function and the scan function, which are the main functions, and the other functions. Accordingly, in the priority table PT1 of the first exemplary embodiment, the priority of the "print/scan" and the priority of the "I-FAX" are set to be the same. As a result, the multi-function device 10 is capable of quickly executing the transmission of packets for the print function or the scan function and the transmission of packets for the I-FAX function at the same time. Meanwhile, if the current communication state of the multi-function device 10 is poor, the multi-function device 10 cannot perform simultaneously and quickly the communications for two or more functions, in general. As such, in the priority table PT2 of the above configuration, the priority of the "print/scan" is set to be higher than the priority of the "I-FAX." As a result, since the transmission of packets for the print function or the scan function, which is the main function, is preferentially executed, the multi-function device 10 is capable of quickly executing the transmission of packets for the main function. According to the configuration of the first exemplary embodiment, the multi-function device 10 is capable of properly executing the transmission of packets for the main functions and the sub-function in accordance with the current communication state of the multi-function device 10.

The elements in the first exemplary embodiment correspond to the elements of the present invention will be described. The evaluation value TQ is an example of the "communication state information." The case where step S36 of FIG. 6 is YES (namely, the current communication state of the multi-function device 10 is good) is one example of the "first state", and the case where step S36 of FIG. 6 is NO, (namely, the current communication state of the multi-function device 10 is normal or poor) is one example of the "second state,". In this case, the priority table PT1 and the priority table PT2 or the priority table PT3 are examples of the "first priority order" and the "second priority order," respectively. The "print/scan" and the "I-FAX" are examples of the "first function" and the "second function," respectively. The case where step S38 of FIG. 6 is YES (namely, the current communication state of the multi-function device 10 is normal) is another example of the "first state," and the case where S38 of FIG. 6 is NO (namely, the current communication state of the multi-function device 10 is poor) is another example of the "second state." In this case, the priority table PT2 and the priority table PT3 are examples of the "first priority order" and the "second priority order," respectively. The "print/scan" and the "others (settings etc.)" are examples of the "first function" and the "second function," respectively. The evaluation thresholds X and Y are examples of the "predetermined thresholds." The transmission statistics and the reception statistics are examples of the "packet information."

Second Exemplary Embodiment

Differences between the first exemplary embodiment and the second exemplary embodiment will be described. In the first exemplary embodiment, the first acquisition unit 50 calculates the evaluation value TQ, which indicates values for the communication state, and compares the calculated evaluation value TQ with the evaluation thresholds X and Y (step S36 and step S38 of FIG. 6) to determine whether the current communication state of the multi-function device 10 is good, normal, or poor. Based on the results, the first acquisition unit 50 determines the priority table PT1 to PT3 (steps S40, S42, and S44). Instead of the configuration, in the second exemplary embodiment, the priority tables PT1 to PT3 stored in the memory 32 is already corresponding to the connection speeds of the multi-function device 10. For example, in case of wired communication, the priority table PT3 corresponds to the connection speeds "10 Base Half Duplex" and "10 Base Full Duplex.", the priority table PT2 corresponds to the connection speeds "100 Base Half Duplex" and "100 Base Full Duplex.", and the priority table PT1 corresponds to the connection speeds "1000 Base Half Duplex" and "1000 Base Full Duplex."

In step S16 of FIG. 5, instead of the priority specifying process of FIG. 6, the first acquisition unit 50 acquires a connection speeds of the multi-function device 10, and selects a priority table corresponding to the connection speed. Since the second exemplary embodiment does not execute the priority specifying process of FIG. 6 and the evaluation value calculating process of FIG. 7, the process load of the multi-function device 10 can be reduced. The multi-function device 10 can select a proper priority table based on the connection speed of the multi-function device 10.

The exemplary embodiments of the present invention have been described in detail. The exemplary embodiments are merely exemplary. The scope of the claims is not limited to the described exemplary embodiments. The technology includes various changes and modifications to the exemplary embodiments that have been described. For example, the following modified embodiments may be adopted.

Modified Embodiment 1

In the first exemplary embodiment, the first acquisition unit 50 calculates the evaluation value TQ by using the three communication quality information TQ1, TQ2, and TQ3. Instead of the configuration, the first acquisition unit 50 may calculate the evaluation value TQ by using one or two of the communication quality information TQ1, TQ2, and TQ3.

Modified Embodiment 2

According to the first and second exemplary embodiments, in step S20 of FIG. 5, the data transmission unit 54 preferentially transmits packets for a function having a high-priority stored in the transmission queue, and then packets for a function having a low-priority stored in the queue. Instead of the configurations, the data transmission unit 54 may transmit each of the packets in the transmission queue so that the frequency of the transmission of packets for a function having the high-priority stored in the transmission queue (i.e., the number of packets transmitted for a unit time period) is higher than the frequency of the transmission of packets for a function having a low-priority stored in the transmission queue. The data transmission unit 54 may transmit each of the packets in the transmission queue so that a data transmission amount (data size) for a function having the high-priority per a unit time period is larger than a data transmission amount for a function having a low-priority per a unit time period. Any of the exemplary embodiments is included in the configuration that "preferentially executing a transmission of data for a high-priority function earlier than a transmission of data for a low-priority function, based on the determined priority order."

Modified Embodiment 3

In the wireless connection speed table of FIG. 4, only one coefficient corresponds to each connection speed. Instead of the configuration, a plurality of coefficients may be corresponds each connection speed according to the radio wave state. If the connection speed of the multi-function device 10 is "802.11b," a coefficient in case of the good radio wave state may be set as "1.2", a coefficient in case of the normal radio wave state may be set as "1.0", and a coefficient in case of the poor radio wave state may be set as "0.8".

Modified Embodiment 4

When the multi-function device 10 performs the wireless communication, the multi-function device 10 may be capable of executing roaming. In that case, it is preferably that the multi-function device 10 is a mobile wireless terminal such as a smart phone. That is, when the multi-function device 10 is moving, the multi-function device 10 may be capable of performing communication while switching connection to an access point of movement destination. According to this exemplary embodiment, the connection speed of the multi-function device 10 in the wireless communication may vary among 802.11b/a/g/n. In other words, the multi-function device 10 may not include the print function, the scan function, and the I-FAX function, and the multi-function device 10 only have to include at least two functions that are to be set the priority orders.

Modified Embodiment 5

In the first exemplary embodiment, the determination unit 52 calculates the evaluation value TQ by using the communication quality information TQ1, TQ2, and TQ3, and compares the calculated evaluation value TQ with the evaluation thresholds X and Y. Based on the results, the determination unit 52 determines the priority tables PT1, PT2, and PT3. Instead of the time, at the time that the communication quality information TQ1 is calculated, the determination unit 52 determines the priority tables PT1, PT2, and PT3 in accordance with the value for the communication quality information TQ1. In accordance with the determined priority tables, the determination unit 52 starts the packet transmitting process. Thereafter, at the time that TQ2 and TQ3 are calculated, the determination unit 52 may determine whether or not to change the priority tables determined in accordance with the values for TQ2 and TQ3 into other priority tables.

Modified Embodiment 6

In the first exemplary embodiment, the first acquisition unit 50 calculates the evaluation value TQ by using the communication quality information TQ1, TQ2, and TQ3. Instead, the first acquisition unit 50 may acquire the evaluation value TQ from a server monitoring the communication of the multi-function device 10. The modified exemplary embodiment 6 is included in the configuration that "acquiring communication state information related to the current communication state of the multi-function device."

Modified Embodiment 7

In the first exemplary embodiment, the data transmission unit 54 may execute the PQ process only for a predetermined time period (e.g., 10 ms). If the PQ process is executed without limitation, packets only for a function having the high-priority may be continuously transmitted. In other words, packets for functions with the medium-priority and the low-priority the priority may not be transmitted.

Modified Embodiment 8

The function of each of the units (e.g., the first acquisition unit 50, the determination unit 52, the data transmission unit 54, and the second acquisition unit 56) described in this specification may be configured by hardware such as a logic circuit, or software.

Modified Embodiment 9

In the scan function of the first exemplary embodiment, when packets including a scan execution command are received from an external device (e.g., the terminal device 60) (S10 of FIG. 5), packets including the scan data are produced (S18 of FIG. 5). However, the present invention is not limited thereto. The multi-function device 10 may produce packets including scan data when user instructions a scan execution commands by operating the operation unit 14.

Modified Embodiment 10

In the first exemplary embodiment, when a packet as a trigger is received, packets are produced and transmitted in accordance with a request. However, the present invention is not limited to the exemplary embodiment. The multi-function device 10 may automatically transmit packets indicating time at a predetermined time, without the packet reception as the trigger, similar to one example of the "others (settings etc.)" function for acquiring the time periodically.

Modified Embodiment 11

A user may change a priority of each of the functions stored in the priority tables PT1 to PT3 of the priority table group 36.

Accordingly, when the user considers that data transmission of a function is to be quickly executed, a user may set a high-priority.

When the user considers that data transmission of a function is not to be quickly executed, a user may set the medium-priority or the low-priority.

The technical elements described in this specification and/or the drawings achieve their technical utility individually or in various combinations thereof, and are not limited to the combination defined in the specification at the time of the filing of this application. The technology described in this specification and/or the drawings achieves a plurality of objects at the same time, and has technical utility even if it achieves one of the pluralities of objects.

What is claimed is:

1. A multi-function device comprising:
a processor;
an interface configured to be connected to a network; and
memory storing a first priority table and a second priority table, wherein the first priority table comprises a plurality of functions of the multi-function device, each of the plurality of functions being associated with a priority value, and the second priority table comprises the plurality of functions of the multi-function device, each of the plurality of the functions being associated with a priority value;
wherein the memory further stores instructions that, when executed by the processor, cause the multi-function device to:
acquire communication state information relating to a current communication state of the multi-function device, the communication state information comprising an evaluation value determined based on at least a current connection speed of certain data communicated via the interface, the communication state information being acquired by calculating a numerical current communication state of the multi-function device;
determine whether the communication state information is in a first range or a second range, the communication state information being in the first range when the calculated communication state information is greater than a first threshold value; and the communication state information being in the second range when the calculated communication state information is less then the first threshold value;
store a plurality of packets in a transmission queue, each of the plurality of packets being scheduled to be transmitted in a particular order, each of the plurality of packets being associated with one of the plurality of functions;
when determined that the communication state information is in the first range:
determine a priority value for each of the plurality of packets in accordance with the function of each packet, by referring to the first priority table stored in the memory,
determine a first particular packet having the highest determined priority value, and
transmit, from the transmission queue, the first particular packet first regardless the scheduled particular order; and
when determined that the communication state information is in the second range:

determine a priority value for each of the plurality of packets in accordance with the function of each packet, by referring to the second priority table stored in the memory, determine a second particular packet having the highest determined priority value, and transmit, from the transmission queue, the second particular packet first regardless of the scheduled particular order.

2. The multi-function device according to claim 1,
wherein the communication state information is acquired by:
  acquiring packet information related to packets communicated by the multi-function device for a predetermined time period, the predetermined time period being defined as a predetermined amount of time prior to the present time, and
  calculating the numerical communication state information in accordance with the acquired packet information.

3. The multi-function device according to claim 2,
wherein the packet information is information related to at least one of:
  the number of all packets communicated by the multi-function device during the predetermined time period;
  a total data size of all packets communicated by the multi-function device during the predetermined time period; and
  the number of error packets communicated by the multi-function device during the predetermined time period.

4. The multi-function device according to claim 1,
wherein the first priority table corresponds to a first connection speed,
wherein the second priority table corresponds to a second connection speed different from the first connection speed, and
wherein it is determined whether the communication state information is in the first range or in the second range in accordance with the evaluation value indicating the current connection speed of the multi-function device.

5. The multi-function device according to claim 1,
wherein the multi-function device is configured to implement primary function and a second function,
  wherein, the first priority table defines a first priority for the primary function and a second priority for the secondary function, the first priority being equal to or higher than the second priority,
  wherein, the second priority table defines a third priority for the primary function and a fourth priority for the second function, the third priority being higher than the fourth priority, and
  wherein, a difference between the third priority and the fourth priority is greater than a difference between the first priority and the second priority.

6. A non-transitory computer-readable medium having instructions to control a computer embedded in a multi-function device to perform a method, the method comprising:
  storing a first priority table and a second priority table, wherein the first priority table comprises a plurality of functions of the multi-function device, each of the plurality of functions being associated with a priority value, and the second priority table comprises the plurality of functions of the multi-function device, each of the plurality of the functions being associated with a priority value;
  acquiring communication state information relating to a current communication state of the multi-function device, the communication state information comprising an evaluation value (TQ) determined based on at least a current connection speed of certain data communicated via an interface, the communication state information being acquired by calculating a numerical current communication state of the multi-function device;
  determining whether the communication state information is in a first range or a second range, the communication state information being in the first range when the calculated communication state information is greater than a first threshold value; and the communication state information being in the second range when the calculated communication state information is less then the first threshold value;
  storing a plurality of packets in a transmission queue, each of the plurality of packets being scheduled to be transmitted in a particular order, each of the plurality of packets being associated with one of the plurality of functions;
  when determined that the communication state information is in the first range:
    determining a priority value for each of the plurality of packets in accordance with the function of the each packet, by referring to the first priority table (PT1) stored in the memory,
    determining a first particular packet having the highest determined priority value, and
    transmitting, from the transmission queue, the first particular packet first regardless the scheduled particular order; and
  when determined that the communication state information is in the second range:
    determining a priority value for each of the plurality of packets in accordance with the function of the each packet, by referring to the second priority table (PT2) stored in the memory,
    determining a second particular packet having the highest determined priority value, and
    transmitting, from the transmission queue, the second particular packet first regardless of the scheduled particular order.

* * * * *